United States Patent [19]

Vanaschen et al.

[11] Patent Number: 5,022,906
[45] Date of Patent: Jun. 11, 1991

[54] PROCESS FOR OBTAINING BENT-TEMPERED MOTOR VEHICLE GLAZINGS

[75] Inventors: Luc Vanaschen, Eupen; Hans-Werner Kuster, Aachen; Hubert Havenith, Wurselen; Benoit D'Iribarne, Aachen, all of Fed. Rep. of Germany

[73] Assignee: Saint-Gobain Vitrage International, Courbevoie, France

[21] Appl. No.: 450,088

[22] Filed: Dec. 13, 1989

[30] Foreign Application Priority Data

Dec. 14, 1988 [DE] Fed. Rep. of Germany ..... 38411989

[51] Int. Cl.[5] .................. C03B 23/03; C03B 27/044
[52] U.S. Cl. ........................................ 65/104; 65/106; 65/268; 65/273; 65/374.12
[58] Field of Search ................ 65/104, 106, 273, 290, 65/291, 348, 374.12, 268, 114

[56] References Cited

U.S. PATENT DOCUMENTS 4,906,271 3/1990 D'Iribarne et al. .................. 65/273

Primary Examiner—Joye L. Woodard
Attorney, Agent, or Firm—Oblon, Spivak, McClelland, Maier & Neustadt

[57] ABSTRACT

A process and device for obtaining bent-tempered motor vehicle glazings exhibiting a greatly bent marginal zone comprises a glass sheet heated in a furnace and shaped by pressing the glass sheet between a solid upper form and a bending frame, of which at least one side part is bent during pressing. The side part is covered with an elastically deformable felt material and is removed from the glass sheet during tempering, while the main part of the glass sheet remains supported by the bending frame which also serves as a tempering frame.

6 Claims, 5 Drawing Sheets

PROCESS FOR OBTAINING BENT-TEMPERED MOTOR VEHICLE GLAZINGS

BACKGROUND OF THE INVENTION

1. Field of the Invention

The invention relates to techniques for obtaining bent and tempered motor vehicle glazings, according to which the glass sheets are heated to the bending temperature in a horizontal tunnel furnace, are bent to a desired shape, in a horizontal position, by pressing the glass sheets between a solid upper form and a lower form of the frame type, the lower form having several parts that are mobile relative to one another, at least one of the parts being bent during pressing, then carrying the bent glass sheets on a conveying and tempering frame corresponding to the shape of the bent glass sheets into a tempering station where they are tempered by blowing cold air.

2. Description of the Related Art

A process of this type is known from U.S. Pat. No. 4,661,141. The use of bending frames in several parts has proven necessary for the production of glazings of complex shapes. According to the above-mentioned document, after the bending, the glass sheet is kept against the upper form by suction. The bending frame is lowered and brought by a side outlet outside the bending station. The glass sheet is then taken over by a conveying frame in a single part whose profile corresponds to the bending profile imparted to the glass sheet, then the bent glass sheet is carried on this conveying frame into the tempering station. During the operation of tempering by blowing cold air, the glass sheet is supported all along its periphery by this frame which consists of a single nondeformable part.

Under certain conditions, this known process can be used according to a simplified mode; according to the latter, the lower bending form made up of several parts also serves as a conveying and tempering frame. This makes it possible to shorten the cycle time and to simplify the device overall.

This variant embodiment, in which one and the same frame is used for bending and tempering, unfortunately cannot be used for the production of glazings exhibiting a pronounced bending close to their edges. In this case, deformations appear at the very bent marginal zones, these deformations are in the form of small undulations that create optical defects. Analysis shows that these undulating deformations are due both to the bending tool and to the mode of cooling in the tempering station and that they cannot be eliminated by a single adjustment of the parameters of the process within the context of usual well-known adjustment measures.

Also, from the patent DE-A-35 25909 a process of bending and tempering motor vehicle glazings is known according to which the glass sheets, heated in a horizontal tunnel furnace, are brought in a horizontal position between an upper form and a lower form of several parts and, after the bending process by pressing, are directly tempered in the bending station by cold air blown in the direction of the glass sheets through orifices made in the bending tools. The lower bending form consists of an outside frame in several parts, connected together by joints, surrounding an inside solid form provided with orifices for the blown air. The contact surface of the bending form, i.e., the surface of the lower form surrounded by the outside frame, against which the glass sheet is actually flattened, is covered with a mat of refractory fibers. During the tempering process, the glass sheet is supported only by the outside frame. Further, this process does not apply to the production of glass sheets comprising very bent marginal zones.

Finally, it is known from patent application DE-A-35 41773 to cover solid bending forms with a felt mat preferably exhibiting a thickness between 3 and 10 mm and which contains, among others, thin steel fibers.

SUMMARY OF THE INVENTION

Accordingly, an object of this invention is to provide for a novel process which makes it possible to obtain motor vehicle glazings, one or more of whose marginal zones are greatly bent and yet are of a perfect optical quality, i.e., without undesirable deformations of the glass sheet.

Accordingly, the present invention relates to a process for obtaining bent-tempered motor vehicle glazings having at least one bent marginal zone, wherein glass sheets are bent to a desired shape in a horizontal position, comprising the steps of, heating the glass sheets to a bending temperature in a horizontal tunnel furnace; pressing the glass sheets between a solid upper form and a bending form to obtain the desired bent shape, the bending form having an opening in its center and comprising several parts which are movable relative to one another, the bending form serving as a lower bending form with at least one of the parts being rotated to a bent position during the pressing to deform the marginal zone, said at least one of said parts being covered with an elastically deformable felt material of refractory fibers; carrying the bent glass sheets by way of a conveying and tempering frame which corresponds to the shape of the bent glass sheets into a tempering station; tempering the glass sheets in said tempering station by blowing cold air on the glass sheets; and rotating said at least one of said parts from said bent position to a position in which said at least one of said parts is removed from the glass sheets during the tempering step.

Because of the covering of the mobile side parts of the bending frame with an elastically deformable felt material, an equalizing of the application of the forces is produced, i.e., the relatively fine layer of felt material acts by making uniform the bending forces applied over the entire contact surface of the glass sheet. The covering thus makes it possible to keep the intensity of the bending force which acts on the glass sheet from becoming too great locally, which systematically was the case previously as soon as it was desired to produce glazings comprising very greatly bent marginal zones and which led to inevitable warping of the marginal zones, with the drawbacks mentioned above. The swinging part of the bending frame provided with this felt covering can thus apply these marginal zones of the glass sheet against the upper bending form with a uniform pressure and gentleness so that the glass sheet remains totally free of optical defects.

Another characteristic of the process according to the invention consists in the fact that at the beginning of the tempering process, when the glass sheet is brought into the tempering station by the bending frame, the mobile side part of the bending frame is removed from the glass sheet which can thus be directly subjected to the action of the cooling air and not masked by this side part. With this procedure, the marginal zone of the glass sheet is no longer supported mechanically during tempering; however, because of the great deformation undergone, this marginal zone of the glass sheet has, at this marginal zone, a rigidity which is sufficient to avoid any additional deformation during the tempering process.

The process according to the invention thus allows the production of glazings comprising greatly bent edges by using only a single frame which also is used as the bending frame, the frame for conveying to the tempering station and the tempering frame, which leads to relatively short cycle times.

The present invention also relates to a device for obtaining bent-tempered motor vehicle glazings having at least one bent marginal zone comprising, a horizontal tunnel furnace for heating the glass sheet to a bending temperature; a bending station contiguous with the furnace and comprising a solid upper form; a tempering station positioned after the bending station; and a bending frame being opened in its center and comprising several parts which are movable relative to one another, the bending frame acting as a lower bending form, the lower bending form being movable between the bending station and the tempering station; wherein an elastically deformable felt material of refractory fibers is fastened to one of the parts of the bending frame.

Preferably, a felt of metal fibers, advantageously of stainless steel fibers of the nickel-chromium alloy type is used, a porosity of 70% then being required to obtain the desired elasticity.

The manner and means used to bring the glass sheet heated to the bending temperature between the bending forms, are not an essential part of this invention and various processes known in this art are suitable. Suction, for example, can be used on the glass sheet when it reaches the end of the conveyor going through the furnace and placed on the bending frame. Another possibility consists in extending the conveyor into the bending station in which the upper form is suspended from raising-lowering means and is connected to suction means which lift the glass sheet. It is also possible to apply the glass sheet against the upper form by a rising hot air current or to use, to lift it, a frame that is housed under the conveyor between two operations, the frame lifting the glass sheet until it is in contact with the upper form provided with a suction surface, then is lowered onto the conveyor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
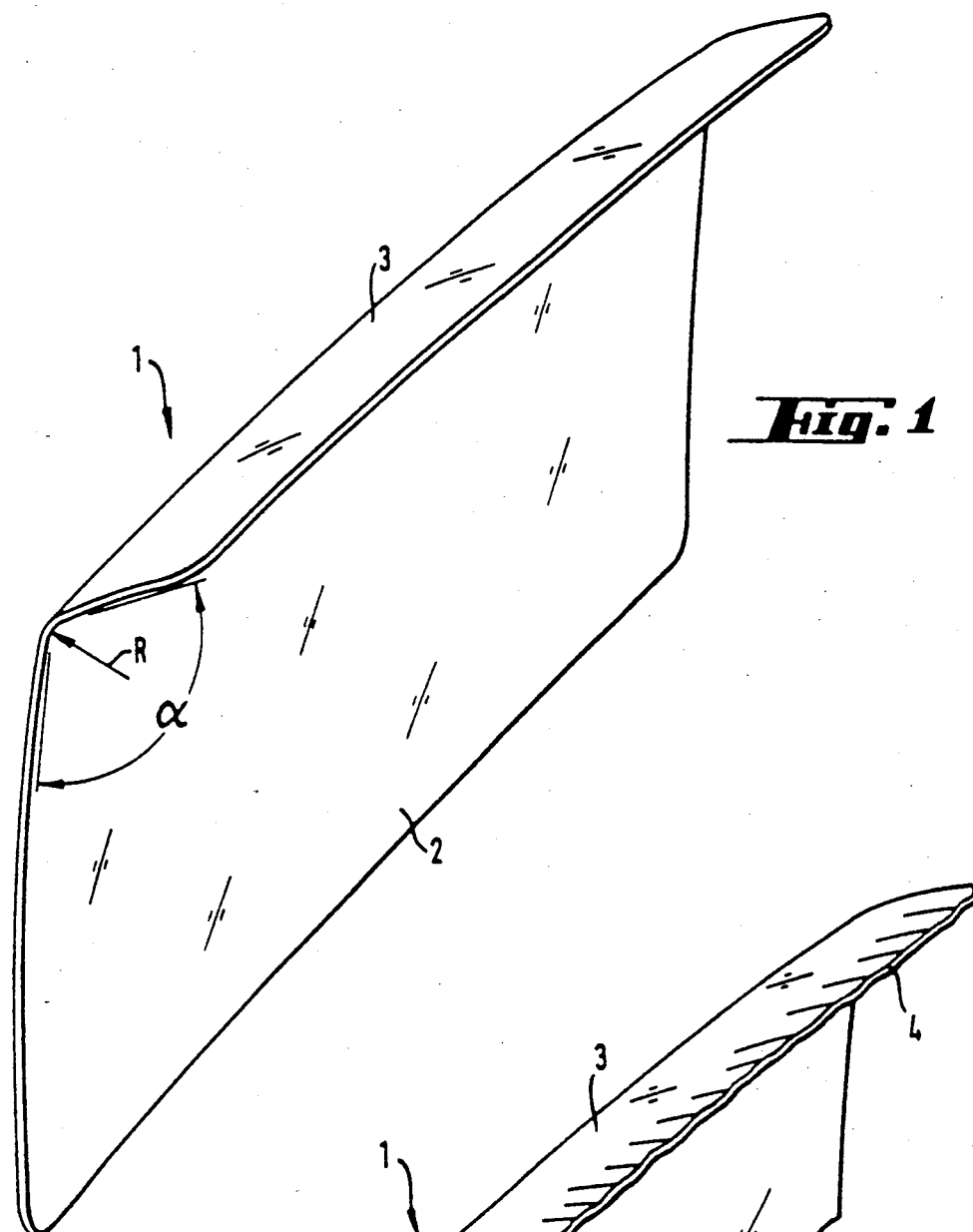
FIG. 1 shows a motor vehicle glazing, comprising a relatively greatly bent marginal zone for whose production the process according to the invention is more particularly suitable.

By way of example, FIG. 1 represents a shape of glass sheet 1 typically produced by following the teaching of the process according to the invention. Glass sheet 1 of a thermally tempered safety glazing exhibits a central zone 2 with a slightly spherical bending and a marginal zone 3 which is placed at an angle alpha of about 80° relative to the central zone. The radius of curvature R is about 4 cm. The marginal zone has a slightly spherical bend.

Figure 2:
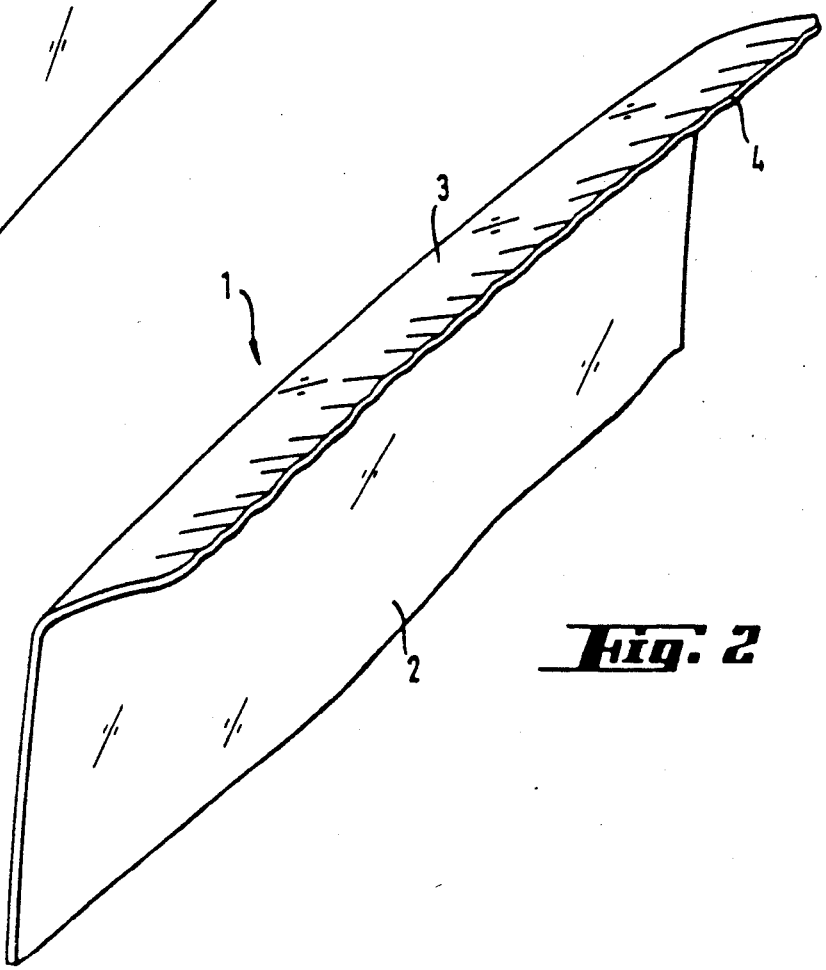
FIG. 2 shows a motor vehicle glazing of the same type as that represented in FIG. 1 and comprising typical shaping defects of glazings obtained with conventional processes.

FIG. 2 shows the type of deformations obtained with conventional bending processes. Along edge 4 of marginal zone 3, deformations are formed in the shape of undulations which constitute optical defects. These very detrimental deformations are prevented with the measures according to the present invention.

Figure 3:
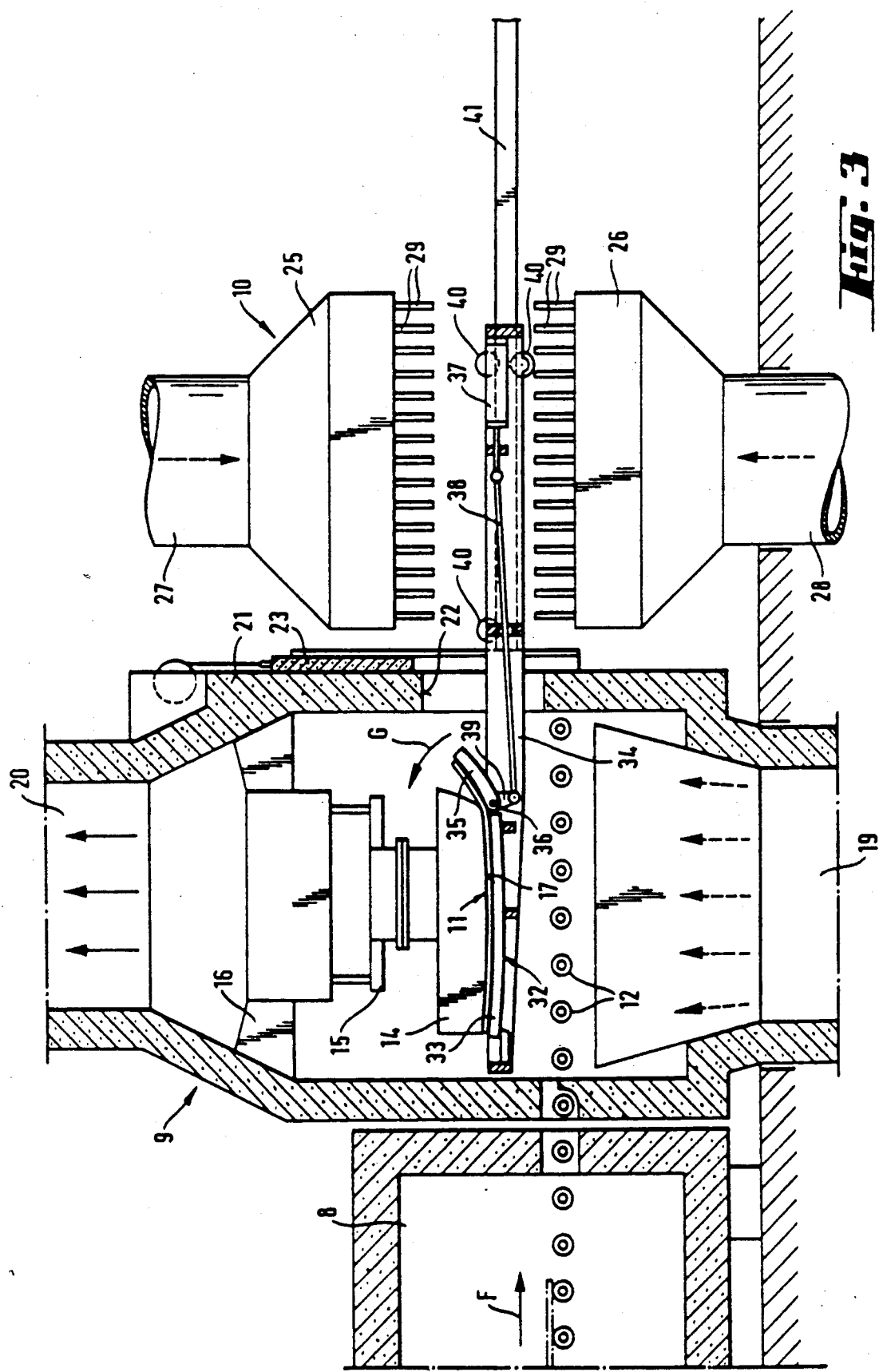
FIG. 3 shows a longitudinal section of a bending-tempering installation, seen during bending.
Figure 4:
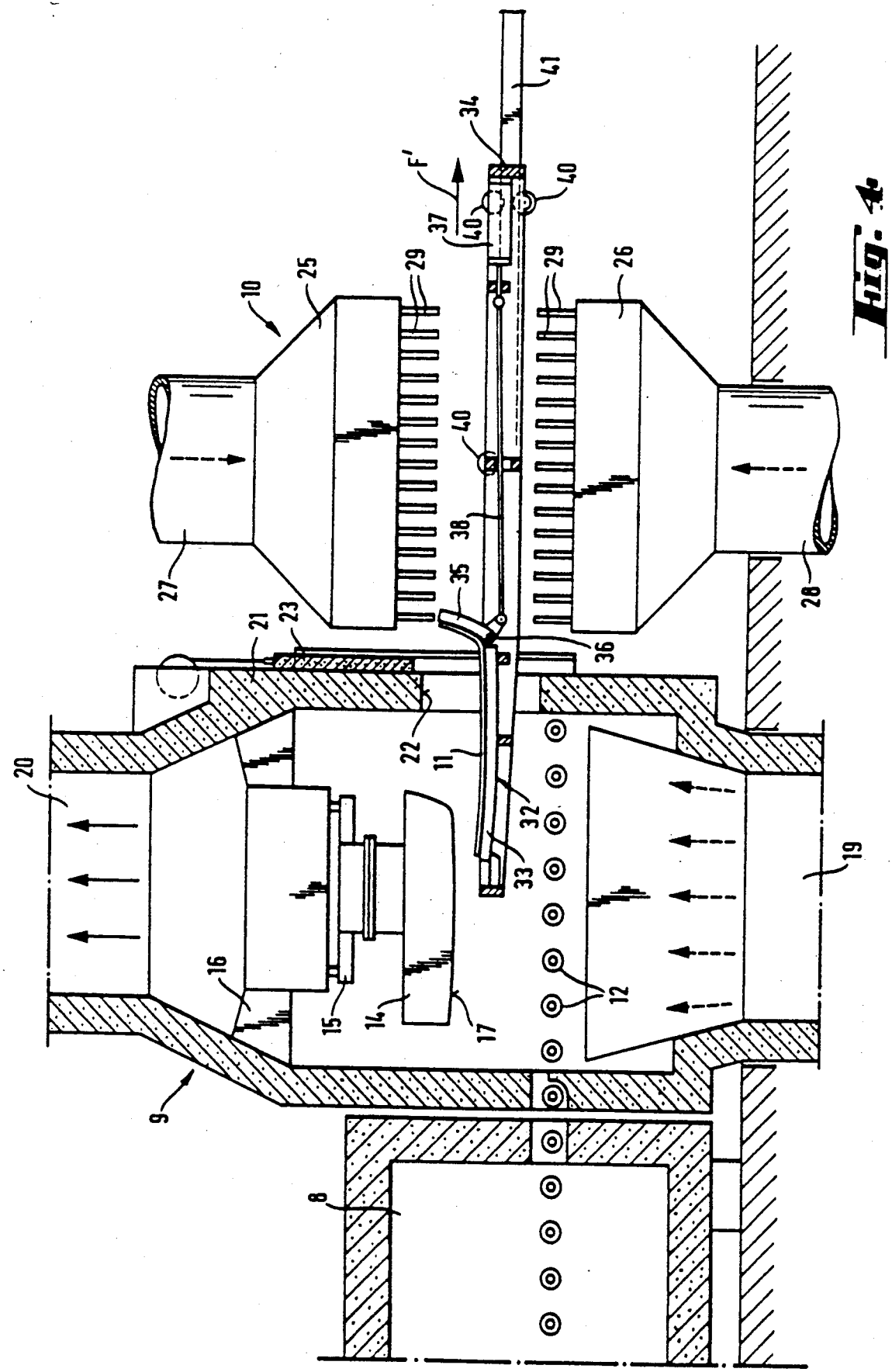
FIG. 4 shows the installation represented in FIG. 3, seen during conveying of a bent glass sheet to the tempering station.
Figure 5:
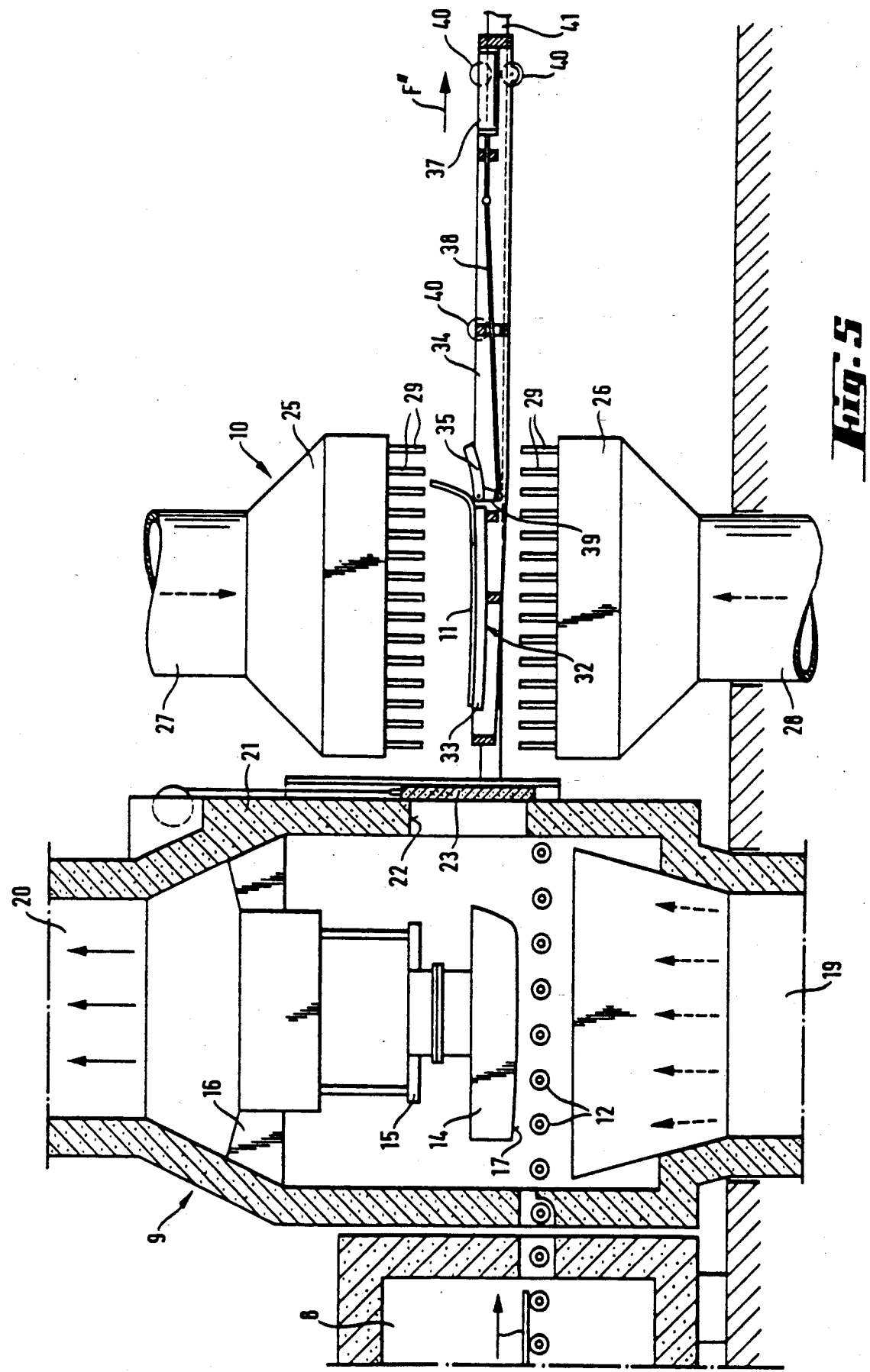
FIG. 5 shows the installation represented in FIG. 3, seen during tempering of a glass sheet.

As shown in FIGS. 3 to 5, a bending-tempering installation provided for using the process according to the invention comprises a horizontal tunnel furnace 8, a bending station 9 and a tempering station 10. Driving rollers 12 assure the conveying of the glass sheets through furnace 8 and into bending station 9.

An upper bending form 14 fastened to a frame 15 is placed above rollers 12 in bending station 9. Frame 15 is attached to support beams 16 by a raising-lowering device. Upper bending form 14 consists of a solid plate 17 of convex shape, turned downward, and represents the male part of the bending pressure. The bending tools are all placed inside a duct fed through lower part 19 with a hot gas current that can be introduced into the bending zone with an adjustable flow and pressure. The gas current comes out through upper part 20 and is returned to lower part 19 by a closed circuit. Walls 21 of the bending chamber are provided with an opening 22 which can be closed by a door 23.

Tempering station 10 comprises an upper blowing box 25 and a lower blowing box 26, fed cold air respectively by ducts 27 and 28. The cold air is blown on glass sheet 11 by nozzles 29 as soon as the glass sheet is between blowing boxes 25 and 26.

Figure 6:
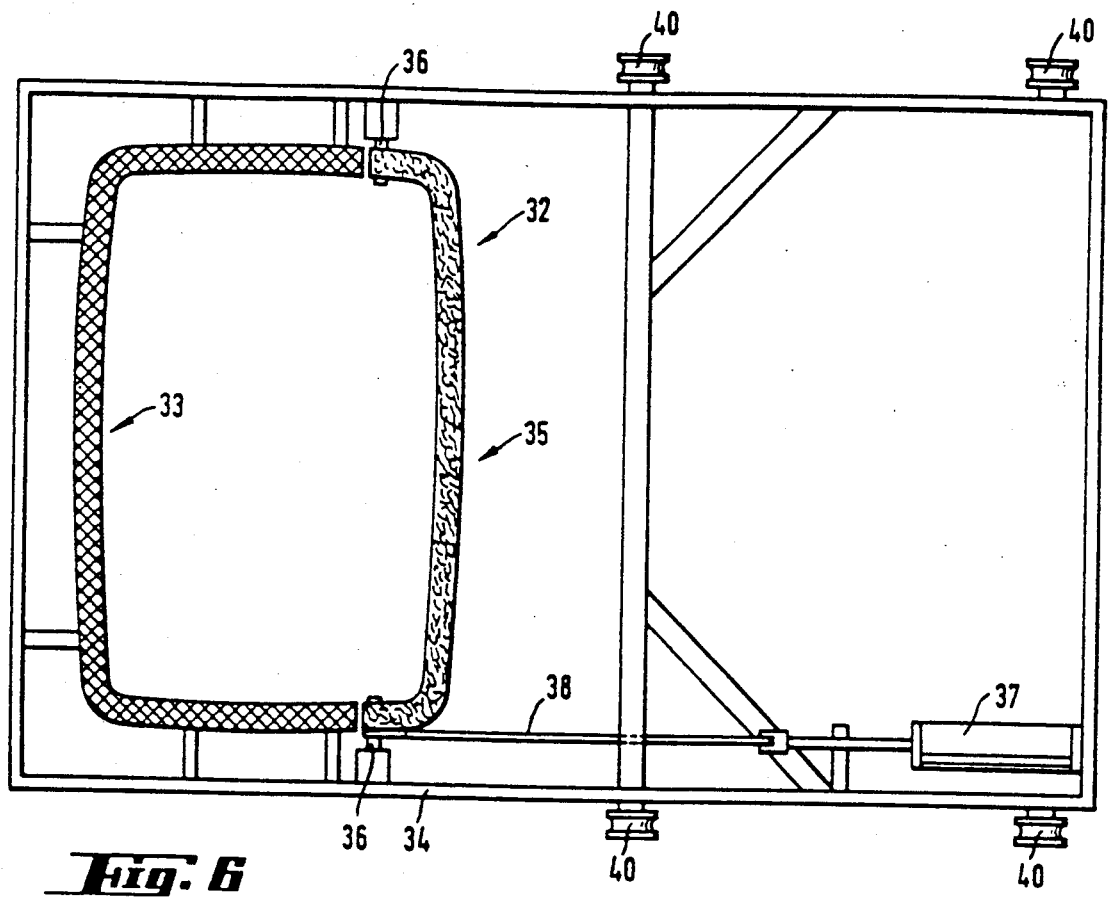
FIG. 6 shows a bending frame according to the invention consisting of several parts.
Figure 7:
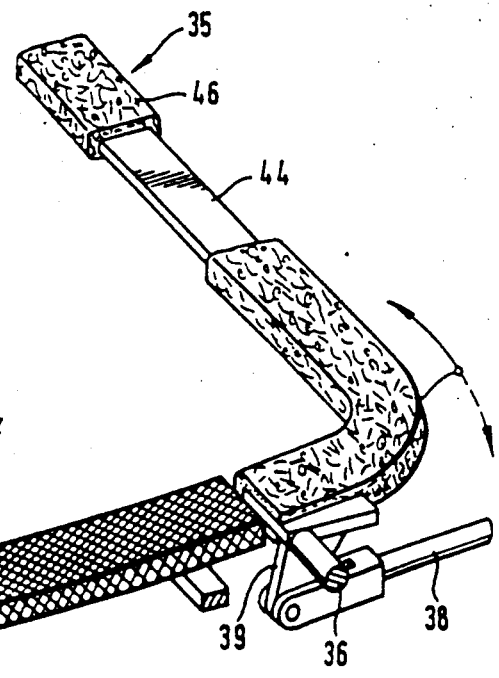
FIG. 7 shows a partial view in perspective, on an enlarged scale, of the frame of FIG. 6.

The installation further comprises a lower form of the bending frame type 32 working with upper form 14. Frame 32 represented here is in two parts and is diagrammed in greater detail in FIGS. 6 and 7. Main part 33 of frame 32 is placed in a stationary manner inside a frame 34; side part 35 of frame 32 is jointed around pin 36; these movements are controlled by a pneumatic cylinder 37 fastened to frame 34 and which acts, thanks to a piston rod 38, on a lever 39 connected to side part 35. Frame 34 is provided with wheels 40 which roll on rails 41; frame 34 can be moved into three positions by a drive means not shown here, namely: a first position in which bending frame 32 is under upper bending frame 14, a second position in which bending frame 32 is between tempering blowing boxes 25 and 26 and a third position in which the bending frame is outside the tempering station, a position during which discharge of the bent-tempered glazings is performed.

Main 33 and side 35 parts of bending frame 32 are made of metal rails 43 and 44 surrounded respectively with coverings 45 and 46. Covering 45, on the one hand, should be a good thermal insulator so as not to cool the glass sheet to be bent when it touches frame 32 cooled during tempering of the preceding glass sheet and, on the other hand, during tempering it should not block the passage of cold air between the surface of the glass sheet and metal rail 33, so that the glass sheet undergoes a uniform tempering even with regard to its surface of contact with main part 33 of frame 32. This covering 45 can, for example, be made of glass fibers or other refractory fibers or fabrics usually used for this purpose.

It is more particularly advantageous to use a covering of steel fibers such as described in European patent application EP-A-312 439. Such a covering consists of an essentially metal fabric formed of slubbings of a plurality of elementary yarns with a diameter less than 50 microns; the fabric has a porosity to air of at least 60% and preferably greater than 80% to allow the tempering air to pass through the covering. The thermal conductivity of the fabric in the direction of the thickness is less than $3 \, W \, M^{-1} \, K^{-1}$ and preferably less than $0.2 \, WM^{-1}K^1$. The fabric, with a thickness of preferably between 0.5 and 2 mm, forms meshes whose surface is preferably between about $4 \, mm^2$ and $100 \, mm^2$.

Covering 46, covering swinging side part 35, consists of a felt of metal fibers whose thickness is between 2 and 10 mm and preferably close to about 3.5 mm. Good results have been obtained with fibers whose diameter is between 5 and 50 microns and is, for example, about 8 microns in diameter, of a nickel-chromium alloy with 80% nickel and 20% chromium. The surface weight of such a metal felt is about $500 \, g/m^2$. The porosity to air of the felt is greater than 80% and preferably greater than 95%. Such a felt exhibits the required elasticity and further has a good heat resistance, a good friction coefficient and a sufficiently high resistance to abrasion. Such felts of metal fibers are available commercially.

FIGS. 3 to 5 illustrate the course of the process according to the invention. The glass sheet goes through furnace 8 in the direction of arrow F and reaches bending station 9 where it is stopped on drive rollers 12 under upper bending form 14 which has previously been lowered into the end position represented in FIG. 5. In this phase, frame 34 carrying bending frame 32 is on the outside of the bending chamber and door 23 closes opening 22. As soon as the glass sheet is correctly immobilized under upper bending form 14, the hot rising gas current is made to pass through the bending station. This gas current lifts the glass sheet above drive rollers 12 and applies it from below against upper bending form 14. Under the action of this gas current, the central part of the glass sheet is deformed to fit the shape of bending surface 17. Upper bending form 14 and glass sheet 11 are then lifted, the gas current still applying glass sheet 11 against form 14.

When upper bending form 14 is in a high position, door 23 is opened and frame 34 enters bending station 9 and is positioned under upper form 14, in the position represented in FIG. 3. Swinging side part 35 of bending frame 32 is in a low position, aligned with main part 33. Upper form 14 can then be lowered so that the glass sheet is pressed against bending frame 32, which makes it possible to put, in the desired final shape, the main part of the glass sheet in contact with main part 33 of frame 32. At the same time, pneumatic cylinder 37 turns side part 35 in the direction indicated by arrow G so that felt covering 46 applies the marginal zone of sheet 11 against upper form 14.

When the bending process is completed, the hot gas current is interrupted or at least greatly reduced and upper bending form 14 is brought back into the high position. Glass sheet 11 then rests on bending frame 32 whose side part 35 is bent in the upper position. Frame 34 then starts toward tempering station 10 in the direction of arrow F' and brings bent glass sheet 11 between blowing boxes 25 and 26. This phase of the process is represented in FIG. 4. Door 23 closes opening 22 as soon as frame 34 has left the bending chamber.

The tempering process can then begin and cold air blowing boxes 25 and 26 are started. At the very moment at which the tempering blowing begins, pneumatic cylinder 37 removes side part 35 from bending frame 32 so that the most bent marginal zone of the glass sheet is not supported. This marginal zone of glass sheet 11 still has sufficient rigidity so that no additional deformations due to the effect of its own weight are produced. This rigidity is due to its great bending and to the slight cooling which is already produced during the conveying from the bending station to the tempering station. The marginal zone can thus be perfectly tempered, since no obstacle blocks the flow of the cooling air near it. During this tempering process, the next glass sheet leaves furnace 8 and enters bending station 9 to be positioned there under the upper bending form.

After the tempering is completed, frame 34 carries the bent-tempered glass sheet from the tempering station to a discharge station (arrow F") and starts again toward bending station 9 for the next cycle once glass sheet 11 has been carried away.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for obtaining bent-tempered motor vehicle glazings having at least one bent marginal zone, wherein glass sheets are bent to a desired shape in a horizontal position, comprising the steps of:
    heating the glass sheets to a bending temperature in a horizontal tunnel furnace;
    pressing the glass sheets between a solid upper form and a bending form to obtain said desired bent shape, said bending form having an opening in its center and comprising several parts which are movable relative to one another, said bending form serving as a lower bending form, said pressing step comprising the further step of rotating at least one of said parts to a bent position during the pressing to deform said marginal zone, said at least one of said parts being covered with an elastically deformable felt material of refractory fibers;
    carrying said bent glass sheets by way of the bending frame into a tempering station;
    tempering said glass sheets in said tempering station by blowing cold air on the glass sheets; and
    rotating, during said tempering step, said at least one of said parts from said bent position to a position in which said at least one of said parts is removed from the glass sheets.

2. The process according to claim 1, wherein said felt material has a thickness of between 2 and 10 mm.

3. The process according to one of claim 1, wherein said felt material comprises metal fibers.

4. The process according to claim 3, wherein said metal fibers are of a nickel-chromium alloy.

5. The process according to claim 4, wherein the porosity of said felt material to air is greater than 80%.

6. The process according to claim 4, wherein said felt material is a felt obtained by agglomeration of nickel-chromium fibers 5 to 50 micrometers thick and with a porosity greater than 95%.

* * * * *

UNITED STATES PATENT AND TRADEMARK OFFICE
CERTIFICATE OF CORRECTION

PATENT NO. : 5,022,906
DATED : June 11, 1991
INVENTOR(S) : Luc Vanaschen et al.

It is certified that error appears in the above-identified patent and that said Letters Patent is hereby corrected as shown below:

ON THE TITLE PAGE:

The Foreign Application Priority Data is incorrect, should be, -- Dec. 14, 1988 [DE] Fed. Rep. of Germany ...........3841989-- and the First Inventor's country of residence is incorrect, should be, -- Luc Vanaschen, Eupen, Belgium--.

Signed and Sealed this

Twenty-fourth Day of November, 1992

Attest:

DOUGLAS B. COMER

*Attesting Officer*  *Acting Commissioner of Patents and Trademarks*